United States Patent [19]

Dytch et al.

[11] Patent Number: 4,638,147
[45] Date of Patent: Jan. 20, 1987

[54] MICROPROCESSOR CONTROLLED THROUGH-FLOW ELECTRIC WATER HEATER

[76] Inventors: Anthony Dytch, 3 Brompton Lawns, Mill Lane, Tettenhall, Wolverhampton, West Midlands; Andrew Keatley, 21 The Leasow, Aldridge, Walsall, West Midlands; William Wright, 13 Boscobsel Road, Walsall, West Midlands, all of United Kingdom

[21] Appl. No.: 661,903

[22] Filed: Oct. 17, 1984

[30] Foreign Application Priority Data

Oct. 18, 1983 [GB] United Kingdom ............... 8327865

[51] Int. Cl.$^4$ ............................ H05B 1/02; F24H 1/10
[52] U.S. Cl. ..................................... 219/308; 219/298; 219/306; 219/309; 219/328; 219/330; 219/484; 219/486; 219/497
[58] Field of Search ............................... 219/296–299, 219/301–309, 328, 331, 330, 486, 487, 484, 497–499

[56] References Cited

U.S. PATENT DOCUMENTS

| 3,261,963 | 7/1966 | Weinstein | 219/308 |
| 4,167,663 | 9/1979 | Granzow et al. | 219/330 X |
| 4,337,388 | 6/1982 | July | 219/308 X |

FOREIGN PATENT DOCUMENTS

| 2343273 | 3/1975 | Fed. Rep. of Germany | 219/309 |
| 3306807 | 8/1984 | Fed. Rep. of Germany | 219/308 |
| 3304322 | 8/1984 | Fed. Rep. of Germany | 219/309 |
| 1380079 | 1/1975 | United Kingdom . | |
| 1419618 | 12/1975 | United Kingdom . | |
| 2007046 | 5/1979 | United Kingdom | 219/308 |
| 2026661 | 2/1980 | United Kingdom . | |
| 2040121 | 8/1980 | United Kingdom | 219/308 |
| 2052109 | 1/1981 | United Kingdom . | |
| 2102164 | 1/1983 | United Kingdom . | |
| 2115912 | 9/1983 | United Kingdom | 219/309 |

OTHER PUBLICATIONS

"Instant Hot Water Flows from Cold-Water Pipe", Popular Science, Jul. 1961, pp. 44, 45, 46 and 182.

*Primary Examiner*—A. Bartis
*Attorney, Agent, or Firm*—Klarquist, Sparkman, Campbell, Leigh & Whinston

[57] ABSTRACT

A through-flow electric water heater has a cannister through which water to be heated flows and in which are disposed a first heating means comprising a plurality of electric heating elements and second heating means comprising at least one electric heating element. A control unit comprising a microprocessor receives a first input signal from a flow sensor and a temperature sensor which sense, respectively, the flow rate and temperature of the water flowing into the cannister and switches the plurality of heating elements of the first heating means on and off in different combination to achieve different heating levels and adjusts the level of heat dissipated by burst firing the at least one heating element of the second heating means to achieve a desired total heating level. A second temperature sensor is provided at the water outlet of the cannister to provide a second input to the control unit to adjust the total heat dissipated by the first and second heating means in response to the first and second inputs to maintain the temperature of the outflowing water constant. The heating elements are each switched on and off by its own solid state switching device (triac) mounted in thermal contact with the cannister to dissipate heat created by operation of the switching device to the water flowing through the cannister. A control panel enables the user to selectively adjust the water flow rate and the outflowing water temperature.

8 Claims, 3 Drawing Figures

MICROPROCESSOR CONTROLLED THROUGH-FLOW ELECTRIC WATER HEATER

BACKGROUND OF THE INVENTION

This invention relates to a water heater the type which in use, has a continuous flow of water therethrough, the water being heated by an electrical heating means as it flows. Such a heater will hereinafter be referred to as an instantaneous water heater.

Previously, such water heaters have been provided with an electrical heating means which delivers heat at a fixed rate to the water flowing, and the temperature of the outflowing water is controlled by adjusting the flow rate of the water.

However, in for example, a domestic shower heater application, it is preferred for a user to be able to adjust the rate at which the heat is dissipated to the flowing water, to control the temperature of the outflowing water without having to adjust the flow rate. Thus various proposals have been put forward to achieve this.

First, it has been proposed to rapidly switch the electrical heating means on and off, e.g. at the mains frequency, fifty times per second (in the U.K.), using a solid state device such as a triac, and to vary the number of "on" cycles each second or vary the "on" time relative to the "off" time by changing the frequency of switching or relative durations of the "on" and "off" times, whereby the power dissipated by the heater over a given period, such as each second, can be varied. This technique is known as "burst firing".

An example of a circuit which may be used for such an arrangement is described in U.K. Pat. No. 2,040,121.

However, in for example a domestic shower heater, the electrical power consumed by the heater is large i.e. several kilowatts and it has been found that burst firing a heating means with such high power levels, leads to significant problems in suppression. The advantage of burst firing is that if there is any fluctuation in the flow rate and/or temperature of the inflowing water, such changes can easily be accommodated by sensing this flow rate/temperature change and changing the rate of burst firing or varying the "on" time relative to the "off" time to maintain the temperature of the outflowing water constant.

Another proposal has been for the electrical heating means to comprise a plurality of heating elements each of different heating value, and to switch the elements on and off in different combinations to achieve different heating levels. Such an arrangement is described in U.K. Pat. No. 2,007,046.

However, the disadvantage of such an arrangement is that any small fluctuations in flow rate and/or temperature of the inflowing water cannot easily be accommodated; it would be necessary on sensing such flow rate/temperature change, to switch on or off at least one of the heating elements, which could easily over compensate for the small change. Another disadvantage is that it would be necessary to provide a range of heating elements each of different value, and the tolerance of each element would have to be small so that small changes in temperature of the outflowing water can be achieved, as successive elements are switched on or off. This obviously increases costs.

The advantage of such an arrangement is that there are no suppression problems as with burst fired arrangements.

To minimise the effects of fluctuations in the pressure of inflowing water on the flow rate and temperature of the outflowing water, known water heaters of the kind specified have usually been provided with a pressure reducing valve, whereby the pressure of the water flowing through the heater once set has been maintained substantially constant. However again, such valves are expensive and in any case, do not operate efficiently.

SUMMARY OF THE INVENTION

Accordingly it is one object of the present invention to provide a new or improved water heater of the kind specified.

According to one aspect of the invention we provide a water heater comprising a water inlet and a water outlet, there being, in use, a continuous flow of water from the inlet to the outlet, electrical heating means to heat the water as it flows, wherein the electric heating means comprises a plurality of heating elements each adapted to be switched on and off in response to a control means whereby the heat dissipated to the flowing water from the electric heating means can be varied by arranging for the elements to be switched on and off in different combinations, and at least one of the elements being burst fired.

Thus a water heater in accordance with the invention has the advantage of burst fired arrangements in that it is possible to change the total heat dissipated by the heating means by small amounts, without having significant suppression problems, because the element which is burst fired would only provide a small of the total heat dissipated and thus the power consumed by that element would be relatively small compared with the total value.

If desired, a sensor may be provided to sense any change in flow rate and/or temperature of the inflowing water and provide a first input to the control means to which the control means may respond by either (a) switching on or off one or more of the heating elements, or (b) varying the number of "on" cycles in a given time period of the burst fired element, such as each second, or (c) adjusting the "on" time relative to the "off" time of the burst fired element and/or switching on or off one or more of the other, heating elements, in addition to (b) or (c).

The elements of the electrical heating means which are not burst fired, may all be of different power ratings, although two or more of the elements could alternatively be of the same power rating. Preferably, the burst fired heating element has the smallest heating value of the heating elements, in which case the control means may be arranged to switch all the elements on and off so that the burst fired element is used minimally.

Thus the need to provide any flow rate reducing valve is entirely alleviated because of the pressure and-/or temperature sensor. Preferably however, a temperature sensor is also provided at the outlet to sense the temperature of the outflowing water at least during the period immediately after the heater is switched on, and provide a second input to the control means to which the control means responds.

Of course, it is possible, in use, during the working life of the heater, for the maximum heat which the heating elements are capable of dissipating, to vary, for example if the elements "fur up" to any degree i.e. become encrusted with calcium salts and other deposits, especially in hard water areas.

Further, "furring up" of the flow path of the water can result in changes in the flow rate through the heater for a given pressure, of the outflowing water, during the life of the heater.

Previous water heaters of the kind specified have not been able to cope with such changes although it is standard practice to provide a safety device such as a bimetal switch, to disconnect the power to the heating means should any large rise in temperature be detected, for example as a result of the flow of the heated water becoming completely blocked.

Further, because the heat dissipated can vary significantly from heating means to heating means, even when identically rated, because the tolerances of the heating means are not very close (in order to maintain expense to a minimum), it has been necessary to carefully calibrate each heater although for the above mentioned reasons, this calibration may not remain accurate throughout the life of the heater.

Accordingly, it is another object of the invention to provide a new or improved water heater of the kind specified which overcomes or reduces these problems.

According to a second aspect of the invention we provide a water heater comprising a water inlet and a water outlet, there being, in use, a continuous flow of water from the inlet to the outlet, electrical heating means to heat the water as it flows, the heater further comprising a control means to control the heat dissipated by the heating means, the water inlet having means to sense the flow rate and temperature of the inflowing water and provide a first input to the control means, the water outlet having means to sense the temperature of the outflowing water and provide a second input to the control means at least during the period immediately after the heater is switched on, the control means adjusting the heat dissipated by the heating means in response to said first and second inputs to maintain the temperature of the outflowing water constant.

Thus no pressure reducing valve is required. The first input is provided to calibrate the heater and may be discontinued when the heater has reached a steady state.

Any small fluctuations in flow rate/temperature of the inflowing water thereafter, which may not be noticeable by the user, would be compensated for by the control means in response to the second input, and the flow rate through the heater would appear to the user to remain constant.

The heater may include a safety feature comprising a further temperature sensor downstream of the inlet to provide a further input to the control means should a temperature above a predetermined value be sensed.

The water heater according to the second aspect of the invention may include the features of the water heater according to the first aspect of the invention. In a water heater in accordance with the first or second aspect of the invention, the element or elements of the heating means may be, or each be switched on and off by a triac or other solid state device, in response to an output from the control means.

Thus in a heater according to the first aspect of the invention, the output from the control means to the heating means may comprise a signal to burst fire said one element, and a signal to simply switch one or more of the remaining elements on to achieve a desired heat.

Conveniently, the elements each extend into a canister which may be made of copper or any other material, through which canister said water flows, and the triacs or other solid state devices may be in thermal contact with the canister and thus dissipate any heat created by operation of the solid state devices, to the canister and hence to the water flowing through the canister.

It has been found that in such arrangement, that as they are cooled, the effective working lives of the solid state devices are considerably increased.

The means to sense the flow rate of the inflowing water may comprise a turbine in the water flow, and detector means to detect the rate of rotation of the turbine which will depend upon the flow rate of the inflowing water. The rate of rotation may be detected by a photo transistor, light from a light source being obturated by the rotating turbine, or alternatively the turbine may carry a magnet to cause a reed switch to open or close depending on whether the magnet is or is not in the vicinity thereof. In each case, a pulsed input may be provided to the control means.

Preferably, the control means is arranged so that unless an input is received from the flow rate sensor to indicate at least a predetermined water flow rate through the heater, no signal is supplied to the heating means, and the heating means is not activated.

The temperature of the inflowing water may be sensed by a thermistor or other heat sensitive electronic device, and similarly, the temperature sensor on the outlet, where provided, to sense the temperature of the outflowing water may similarly comprise a thermistor.

A valve means to selectively change the flow rate of the water flow through the heater may be provided, preferably at the opposite side of said temperature and flow rate sensing means, to the heating means.

Further, a control may be provided whereby a user of the heater may give an input command to the control means to cause the temperature of the outflowing water to be increased or decreased as required.

Thus a user may select both the flow rate and temperature of the outflowing water as required.

The control means may conveniently be microprocessor controlled, and thus may be programmed to respond to the various inputs, to provide an output to the heating means, to achieve a controlled outflowing water temperature.

The heating values of all the heating elements, and programming of the control means, may be arranged to provide heat to the flowing water so that the temperature of the outflowing water always lies within a fixed range regardless of any input command by the user of the heater.

Thus the water may never be heated to a temperature above a maximum or actively heated to a temperature below a minimum.

The heater may include a control panel by which the user may issue input command to said control means and the panel may also include said valve means to adjust the flow rate of the inflowing water. The panel may further comprise an indicating means to indicate to the user that the flow rate should be decreased so that the water can be heated to an initial or selected temperature within said range.

It will be appreciated that upon initial operation of the heater, that as the heating elements are becoming warm, that the outflowing water temperature may not be immediately heated to a temperature within said range.

Preferably therefore the control panel includes an indicating means to indicate to the user when a steady state has been reached, and thus the outflowing water temperature is within said range.

BRIEF DESCRIPTION OF THE DRAWINGS

The invention will now be described with the aid of the accompanying drawings in which.

DESCRIPTION OF THE PREFERRED EMBODIMENTS

Figure 1:
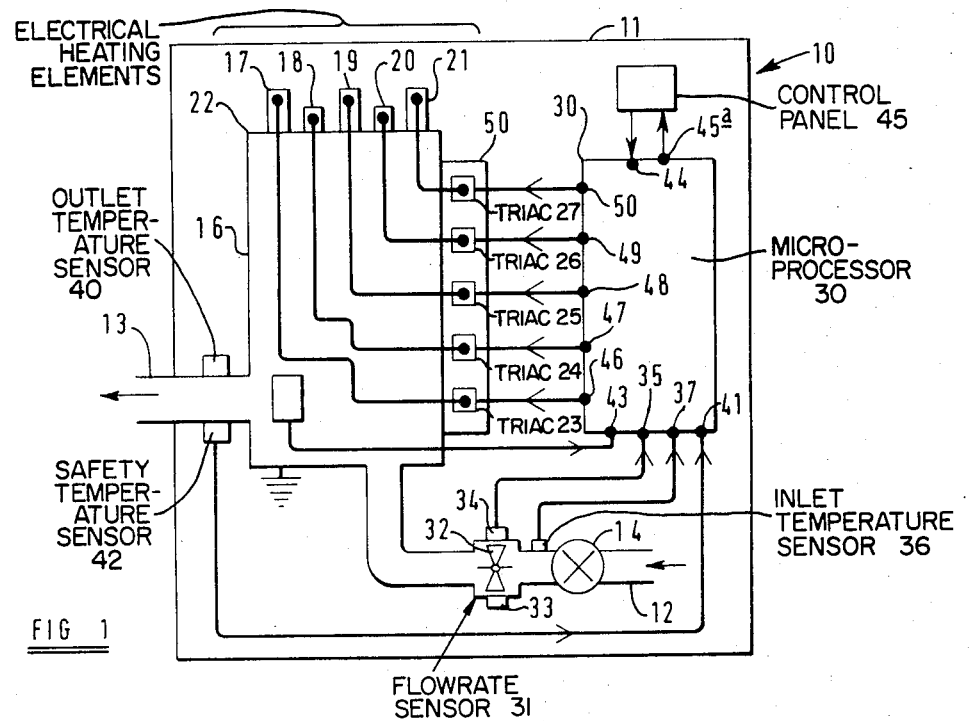
FIG. 1 is a diagrammatic illustration of a water heater in accordance with the invention.

Referring to FIG. 1, a water heater 10 comprises a casing 11 through which a water inlet 12 extends, and from which a water outlet 13 extends. The water inlet 12 may be connected to a water mains, or to a reservoir such as a tank, as required, and water outlet 13 may be connected to, for example, a sprinkler head of a domestic shower or any other apparatus where hot water is required.

Extending through the casing as described hereinafter, is a control comprising a tap of a valve 14 to control the flow rate of water through the heater from the inlet 12 to the outlet 13.

The heater further comprises a canister 16 which may conveniently be made of copper or any other material into which canister 16 a heating means extends, for heating the water as it flows through the heater.

The heating means comprises a plurality, in the present example five, heating elements 17,18,19,20 and 21 which extend through a top wall 22 of the canister 16. The heating elements 17 to 21 are arranged to be electrically energised as hereinafter explained and dissipate heat to the water in the canister 16. The elements 17 to 21 are each switched on and off by solid state electronic devices which in the present example comprise triacs 23 to 27 respectively. The triacs 23 to 27 are signalled by a control means 30 whereby the elements 17 to 21 can be switched on and off in different combinations to achieve different heating levels.

Located between the valve 14 and the canister 16, is a flow rate sensing means 31. In the present case, this comprises a turbine 32 which rotates in response to the flow rate through the sensor 31, which will depend upon the pressure at a given installation, and the nature of the flow path through the heater, and the rate of rotation of the turbine 32 is sensed by electronic means comprising a light source 33 and a photo transistor 34, the turbine 32 obturating the light from the light source 33 so that the transistor 34 provides a pulsed input to a terminal 35 of the control means 30, which input depends upon the flow rate of the inflowing water.

Alternatively, the turbine 32 could carry a magnet which would open or close a reed switch depending on whether or not the magnet was in the vicinity of the reed switch, and again the reed switch would provide a pulsed input to the terminal 35 of the control means 30. Further alternatively, any other means for sensing the flow rate of the water could be provided.

Also provided adjacent the inlet 12, is a temperature sensor 36 comprising a thermistor or other electronic solid state device, which provides a further input to a terminal 37 of the control means 30.

Thus the temperature and flow rate of inflowing water is sensed and the control means 30 is arranged, as hereinafter described, to switch the heating elements 17 to 21 to provide the necessary heat to maintain a constant outflowing water temperature.

Mounted adjacent the outlet 13, is a further thermistor 40 which provides a further input to a terminal 41 of the control means during start-up of the heater depending on the temperature of the outflowing water. Again, any other suitable electronic temperature measuring sensor could be provided.

The sensor 40 senses the temperature of the outflowing water initially so that the heater can be calibrated. The sensor detects the temperature of the water, and thus the control means can compensate, for example one or more of the elements 17 to 21 becoming "furred up" and thus its heating efficiency altered, or the flow rate of the water through the canister changing during the life of the heater, again due to "furring up" of the flow path.

The canister 16 is earthed as a safety feature, and also attached to the canister is a further heat sensor 42 such as a bi-metal switch or further thermistor, to provide a further input to terminal 43 of the control means 30 so that in the event of the sensor 42 detecting a temperature above a predetermined temperature which could be detrimetal to the safety of the heater, all power supplied to the elements 17 to 21 will be disconnected.

The control means is arranged so that a signal can only be supplied to the heating means to heat when a signal is received from the sensor 31 indicating that water is flowing through the heater. Thus a sufficient rise in temperature to actuate sensor 42 could occur only if the control means otherwise failed.

The control means 30 has a further input to a terminal 44 thereof, from a control panel 45 described in more detail hereinafter. The control panel 45 enables a user of the heater to issue an input command to the control means 30 to achieve higher or lower temperature of the outflowing water, and different flow rates of water through the heater.

The control means 30 has a first output via five terminals 46 to 50, each of the terminals 46 to 50 being connected to a triac 23 to 27 respectively, to feed signals from the control means 30 to the triacs, and a second output to the control panel 45 from terminal 45a.

The control means 30 comprises a microprocessor and is programmed to respond to the inputs from terminals 35, 37, 41, 43 and 44, and to adjust the output at terminals 46 to 50 accordingly.

In the present example, the ratings of the elements 17 to 21 are as follows:

Element 17—860 Watts
Element 18—900 Watts
Element 19—900 Watts
Element 20—2,700 Watts
Element 21—2,700 Watts.

Each of the elements 18 to 21 are arranged either to be simply switched on or off in response to signals from the control means 30 and thus using these four elements along, eight different combinations of "switched on" elements are possible as follows:

TABLE 1

| Combination of elements | Total Power |
|---|---|
| 18 or 19 alone | 900 |

TABLE 1-continued

| Combination of elements | Total Power |
| --- | --- |
| 18 and 19 | 1800 |
| 20 or 21 alone | 2700 |
| 18 (or 19) and 20 (or 21) | 3600 |
| 18 and 19 and 20 (or 21) | 4500 |
| 20 and 21 | 5400 |
| 18 (or 19) and 20 and 21 | 6300 |
| 18 and 19 and 20 and 21 | 7200 |

However, element 17 is not simply switched on or off, but is capable of being burst fired. By this we mean that the element 17 is rapidly switched on and off by its triac 23 in response to a signal from the control means at terminal 46. For example, triac 23 may conveniently switch element 17 on and off up to fifty times per second, i.e. as per the mains frequency (in the U.K.).

In the preferred arrangement, the control means 30 calculates the required number of "on" cycles out of fifty each second, to achieve the desired average power, although alternatively the frequency of switching, and/or relative durations of the "on" and "off" times may be changable so that in a given period of time, for example each second, the element 17 can be arranged to dissipate varying amounts of heat.

Preferably, the element 17 has a heating value of 860 Watts and when working at a maximum, i.e. being switched on and off fifty times per second. Thus use of the element 17 at its maximum adds a further eight heating levels to the eight heating levels indicated above, as follows:

TABLE 2

| Heating Level Using Elements 18 to 21 Only | Additional Heating Level Using Element 17 to the Maximum |
| --- | --- |
| 900 | 1760 |
| 1800 | 2660 |
| 2700 | 3560 |
| 3600 | 4460 |
| 4500 | 5360 |
| 5400 | 6260 |
| 6300 | 7160 |
| 7200 | (maximum) 8060 |

However, as the number of "on" and "off" cycles per second of the element 17 can be adjusted by the control means 30, fifty extra heating levels between the levels indicated above (Table 1) without using element 17, and the levels indicated above (Table 2) using element 17 working at its maximum power, can be achieved.

It can be seen from Table 2 that there is a gap of substantially 40 Watts between the maximum which can be achieved with element 17 without bringing in the next heating level, and the next heating level although a user of the water heater would not in normal circumstances be able to detect any temperature change in the outflowing water due to this 40 Watt increase in heat as element 17 is switched off and the next successive heating level, without using element 17, is brought in.

In practice, the control means 30 is only arranged to respond to an input, either as a result of a user of the heater adjusting the water flow rate with valve 14, or from the temperature and flow rate sensors due to fluctuations in temperature and water pressure of the supply, or the user selecting a different temperature (see operation below) where this would require a change of heat dissipation of more than 200 watts.

This differential takes into account the time taken for the heating elements 18 to 21, just switched on, to become heated to their working temperatures, or just switched off, to cool to the ambient temperature in the water system, and/or the time taken for element 17 similarly to react to changes in its rate of burst firing, i.e. the time/thermal constant for the heating elements 17 to 21. By the control means operating in this way, large deviations in water temperature which would otherwise occur due to the time/thermal constant of the heating elements, is prevented. In practice, a user of the shower would not notice fluctuations in temperature of the outflowing water which would result in changes of heat dissipation of less than 200 watts.

Figure 3:
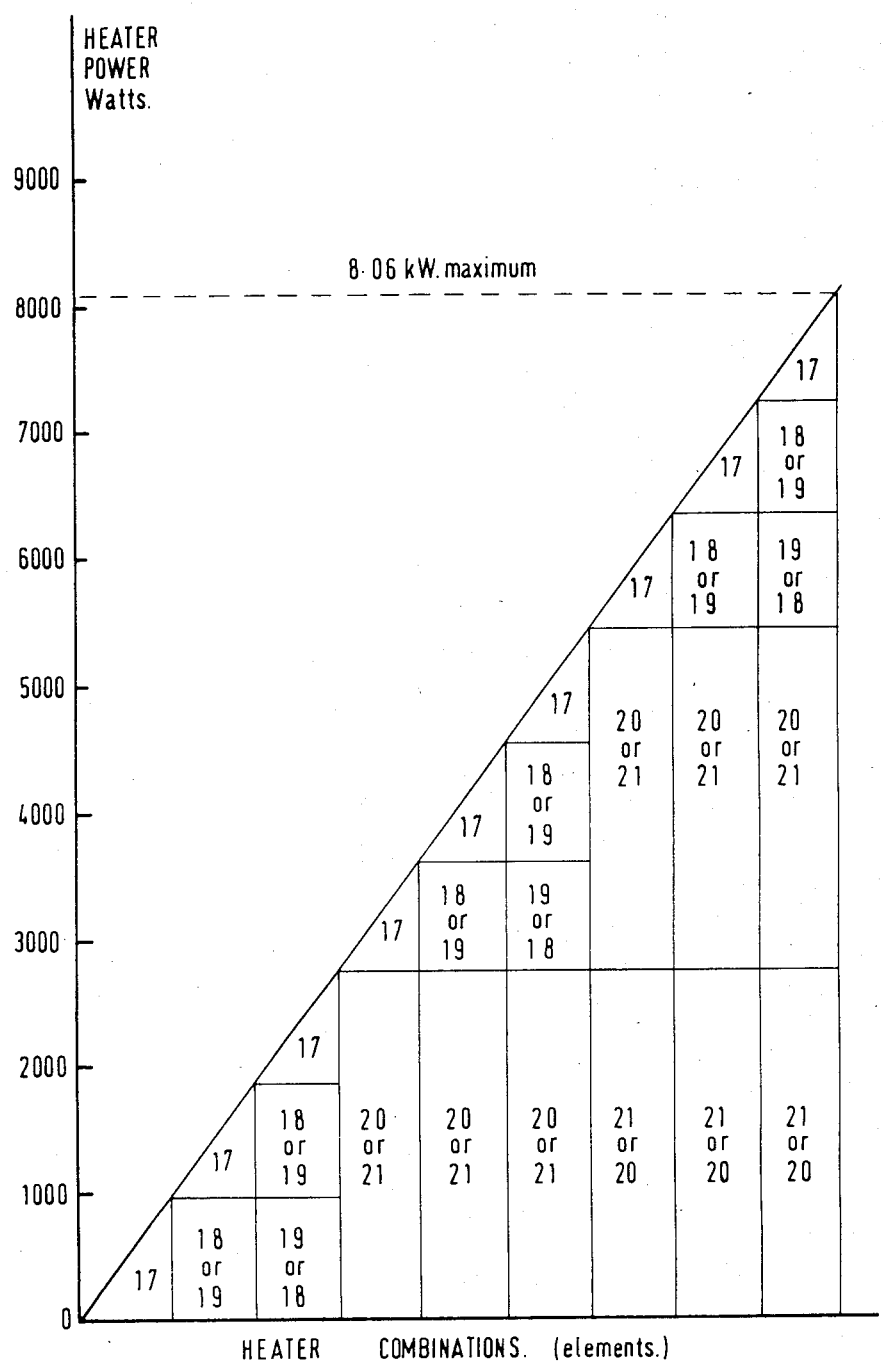
FIG. 3 is a graph showing how different heating levels can be achieved in the heater of FIG. 1.

Referring to FIG. 3, a graph indicates how different heating powers are achieved by switching in different heating elements 18 to 21, and using the burst firing element 17 either working at its minimum, i.e. zero on cycles per second, or at its maximum, i.e. fifty on and off cycles per second. The graph is shown continuous from 0 watts to 8060 watts although it will be appreciated from the above that there is a 40 watt gap in which using elements 17 to 21, intermediate heats cannot be attained.

The triac 23 switches the element on and off by the control means when the mains voltage is zero. In this way, interference which can be produced by burst firing an element of such high power is minimised.

It can be seen that the triacs 23 to 27 are mounted on a plate 50 on the canister 16, and are preferably arranged to be in thermal contact with the canister 16 through the plate 50 so that any heat created upon operation of the triacs 23 to 27 can be dissipated through the canister 16 to the water flowing therethrough.

Figure 2:
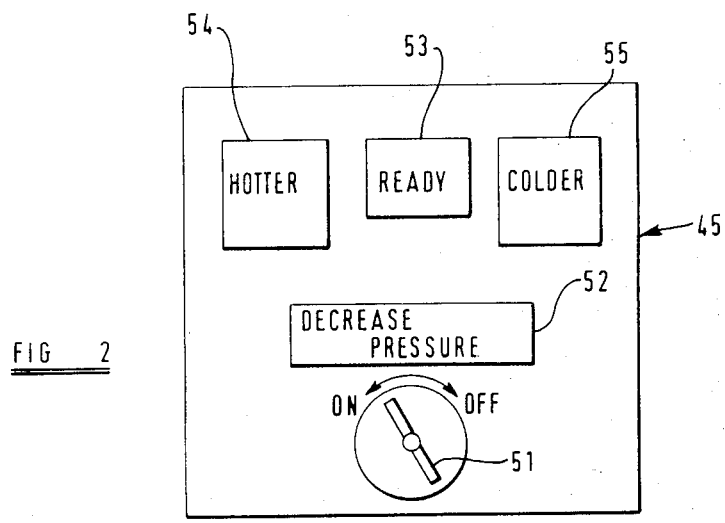
FIG. 2 is one example of a control panel which may be used with the heater of FIG. 1.

Operation of the device will now be described with reference to FIG. 2 which shows one example of a control panel 45 which could be used with the heater shown in FIG. 1.

The panel 45 accommodates the tap 51 of the valve 14 for controlling the flow rate of water through the heater.

Secondly, the control panel 45 includes an indicating means 52 which reads "DECREASE PRESSURE" which means 52 is illuminated should a user select too high a flow rate through the heater for the heating means to be able to raise the temperature of the water to above a minimum temperature as hereinafter explained, or should a user once the heater is in use, wish to increase the temperature of the outflowing water above that which the heating means can attain for the particular flow rate selected.

A further indicating means 53, which reads "READY" is provided so that upon start up of the heater, once a steady heating state has been established through the heater, the indicator 53 will indicate to the user, that the outflowing water has been heated to a temperature above a minimum temperature, again as hereinafter described.

The indicating means 52 and 53 are illuminated in response to a signal from the control means 30 from terminal 45a thereof.

When the tap 51 is moved from the "off" position towards the "on" position, water can flow from the inlet 12 of the heater to the outlet 13 via the temperature sensor 36 and flow rate sensor 31 which provide an input to the control means 30.

The microprocessor of the control means 30 is programmed so that the initial temperature of the water issuing from the outlet 13 will be around 105° F. (40.55° C.)

Thus the heating elements 18 to 21 will be switched on and element 17 burst fired to provide a maximum heat dissipation so that the water flowing through the heater is rapidly raised to this temperature.

When thermistor 40 senses that the temperature of the outflowing water has reached this temperature, the heat dissipated by the elements 17 to 21 will be reduced by switching off one or more of the elements 18 to 21 and/or decreasing the number of "on" cycles of the burst fired element 17 so that a steady state is reached. The sensor 40 then plays no further part in the control of the heating means.

When a steady state has been reached, and the water is issuing from the outlet 13 at 105° F., (40.55° C.) any change in flow rate of the inflowing water, for example due to fluctuations in the pressure of the water supply, or change in temperature of the inflowing water, will be detected by the sensors 31 and 36. The microprocessor 30 will respond to these sensed changes, and further increase or reduce the heat dissipated to the water as required, by switching on or off further elements 18 to 21 and/or increasing or decreasing the number of "on" cycles per second of the burst fired element 17, to maintain the temperature of the outflowing water constant, although as described above, adjustments will not be made where a change in heat dissipation of less than 200 watts is required to maintain the temperature of the out flowing water constant. For example, if the flow rate decreases, the number of "on" cycles per second of the burst fired element 17 may be reduced and/or one or more of the other elements 18 to 21 may be switched off. Alternatively, if a decrease in temperature of the inflowing water is sensed, then the number of "on" cycles per second of element 17 may be increased, and/or one or more of the elements 18 to 21 previously switched off, switched on, in order to maintain the temperature of the outflowing water constant.

Similarly, any changes in the calibration of the heater, due to any reason, for example "furring up" of the canister 16 after prolonged use of the heater, can be accounted for by the thermistor 40 sensing the temperature of the outflowing water on start-up, and the control means 30 will respond accordingly.

If a user wishes to increase or decrease the flow rate using tap 51, with the heater 10 in use, the change in flow rate will again be detected by sensor 31 and will signal the microprocessor 30, which will again respond.

If the user wishes to increase the temperature of the water flowing from a heater, the user may issue an input command to the control means 30 via terminal 44 thereof, by depressing the button 54 marked "HOTTER", and the microprocessor 30 will respond by switching in one or more of the elements 18 to 21, and/or adjusting the number of "on" cycles per second of the element 17 so that the heat dissipated will be increased by the required amount.

Conversely, if a user wishes to reduce the temperature of the outflowing water, the user may issue an input command to the control means by depressing the button 55 marked "COLDER" on the control panel 45, and the control means 30 will respond by reducing the heat dissipated by the elements 17 to 21.

Preferably, the microprocessor of the control means 30 is programmed so that regardless of any command of the user, the water temperature remains within a fixed range for example, between 90° F. (32.22° C.) and 120° F. (48.88° C.)

If a user presses the "HOTTER" button 54 but the elements 17 to 21 are already working to their maximum limits i.e. 8.06 Kilowatts is already being dissipated, the "DECREASE PRESSURE" panel 52 will be illuminated, which will indicate to the user that a higher temperature can only be attained if the flow rate of water through the heater is reduced by turning tap 51 towards the "off" position. Similarly, if on start up, too high a flow rate is selected for the heating means to heat the water to 105° F. (40.55° C.) the "DECREASE PRESSURE" panel 52 will again be illuminated.

Although the invention has been described as being particularly useful in a water heater for a domestic shower, of course such a water heater has many other uses.

Although in the arrangement described, five heating elements 17 to 21 are provided, and only one of these 17 is burst fired, if desired, a different number of heating elements could be provided, and more than one may be burst fired.

It will be noted that in the water heater described with reference to FIGS. 1 and 2, that there is no pressure reducing valve adjacent the inlet 12. This is not required because of the information sensed via sensors 31 and 36 which provide the input to the control means 30.

In a water heater according to the first aspect of the invention, thermistor 40 need not be provided, and in a water heater according to the second aspect of the invention, if desired all or none of the elements may be burst fired, or an alternative electrical heating means could be provided.

Whereas the control means 30 has been described as being a microprocessor, any other convenient electric or other control may be provided if required, although a circuit incorporating a microprocessor and/or integrated or micro circuits, is preferred for reasons of economy of space.

We claim:

1. A water heater comprising a water inlet and a water outlet, passage means between said water inlet and outlet to permit a continuous flow of water from the inlet to the outlet, means to heat the water as it flows from the inlet to the outlet, the heating means comprising first electrical heating means comprising a plurality of heating elements and second electrical heating means comprising at least one heating element, means being provided to switch each of said heating elements of the first electrical heating means on and off in different combinations in response to a control means to achieve different levels of heat dissipation to the flowing water by the first electrical heating means, means to burst fire said at least one heating element of the second electrical heating means to vary the heat dissipated to the flowing water by the second electrical heating means between maximum and minimum heating levels, the control means switching the at least one heating element of second electrical heating means on with at least some of the different combinations of heating elements of the first electrical heating means, and controlling the level of heat dissipation by the first and second electrical heating means to achieve a desired total level of heat dissipation.

2. A water heater according to claim 1 wherein sensor means are provided to sense any change in flow rate and temperature of the inflowing water and provide an input to the control means, the control means being arranged to respond to said signal from the sensor means by at least varying the level of heat dissipation of at least said at least one heating element of the second electrical heating means by varying the number of "on" cycles in a time period of the burst fired at least one heating element.

3. A water heater according to claim 1 wherein sensor means are provided to sense any change in flow rate and temperature of the inflowing water and provide an input to the control means, the control means being arranged to respond to said signal from the sensor means by at least varying the level of heat dissipation of at least the at least one heating element of the second electrical heating means by adjusting the "on" time relative to the "off" time of the burst fired at least one heating element in a set time period.

4. A water heating according to claim 1 wherein the burst fired at least one heating element of the second electrical heating means has a smaller heating value than each of the heating elements of the first electrical heating means, the control means being arranged to switch the elements of the first electrical heating means on and off in such manner that said at least one burst fired heating element of the second electrical heating means is used minimally.

5. A water heater according to claim 1 wherein the water inlet has first sensor means to sense the flow rate and temperature of the inflowing water and provide a first input to the control means, the water outlet having second sensor means to sense the temperature of the outflowing water and provide a second input to the control means at least during the period immediately after the heater is switched on, the control means adjusting the total heat dissipated by the heating means in response to said first and second inputs to maintain the temperature of the outflowing water constant.

6. A water heater according to claim 1 wherein each of said heating elements of the first and second electrical heating means is switched on and off by its own solid state switching device in response to an output from the control means, the elements each extending into a cannister through which, in use, water flows, said solid state switching devices being in thermal contact with the cannister to dissipate any heat created by operation of the solid state switching devices to the cannister and hence to the water which, in use, flows through the cannister.

7. A water heater according to claim 1 wherein a valve means is provided to enable a user to selectively change the flow rate of the water flow through the heater.

8. A water heater according to claim 1 wherein a control is provided whereby a user of the heater may give an input command to the control means to cause the temperature of the outflowing water to be increased or decreased as desired.

* * * * *